United States Patent
Sealey et al.

(10) Patent No.: US 12,197,422 B2
(45) Date of Patent: Jan. 14, 2025

(54) METHODS AND SYSTEMS FOR STORING DATA USING A DISTRIBUTED LEDGER

(71) Applicant: Kabushiki Kaisha Toshiba, Tokyo (JP)

(72) Inventors: Nathan Sealey, Bristol (GB); Adnan Aijaz, Bristol (GB); Ben Holden, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 78 days.

(21) Appl. No.: 17/720,693

(22) Filed: Apr. 14, 2022

(65) Prior Publication Data
US 2023/0334040 A1    Oct. 19, 2023

(51) Int. Cl.
*G06F 16/23*    (2019.01)
*G06F 16/27*    (2019.01)
*G06F 21/60*    (2013.01)

(52) U.S. Cl.
CPC .......... *G06F 16/2379* (2019.01); *G06F 16/27* (2019.01); *G06F 21/602* (2013.01)

(58) Field of Classification Search
None
See application file for complete search history.

(56) References Cited

U.S. PATENT DOCUMENTS

| | | | | |
|---|---|---|---|---|
| 2018/0343114 | A1* | 11/2018 | Ben-Ari | H04L 9/06 |
| 2020/0120157 | A1* | 4/2020 | Xie | H04L 9/0637 |
| 2020/0344290 | A1* | 10/2020 | Krishnaswamy | G06F 9/5083 |
| 2020/0349569 | A1* | 11/2020 | Murao | G06Q 20/407 |
| 2021/0124734 | A1* | 4/2021 | Huang | G06F 16/9024 |
| 2021/0126769 | A1* | 4/2021 | Soundararajan | H04L 9/3239 |
| 2021/0403029 | A1* | 12/2021 | Liu | G06F 16/27 |
| 2022/0166626 | A1* | 5/2022 | Madisetti | H04L 41/40 |
| 2023/0104626 | A1* | 4/2023 | Luedtke | H04L 1/0041 714/776 |
| 2023/0216947 | A1* | 7/2023 | Bernardi | H04L 67/10 713/150 |

FOREIGN PATENT DOCUMENTS

| | | |
|---|---|---|
| CN | 108769968 A | 11/2018 |
| CN | 109413027 A | 3/2019 |

OTHER PUBLICATIONS

Popov, "The Tangle", Apr. 30, 2018, 28 pages.
Coordicide Team, "The Corrdicide", IOTA Foundation, May 2019, 30 pages.
Navarro et al., "Blockchain models for universal connectivity", 2018, 20 pages.

* cited by examiner

*Primary Examiner* — Kris E Mackes
*Assistant Examiner* — Cao D Vuong
(74) *Attorney, Agent, or Firm* — Oblon, McClelland, Maier & Neustadt, L.L.P.

(57) ABSTRACT

A computer-implemented method for storing data using a distributed ledger maintained across a network of computer nodes having a mesh-based architecture, the method comprising: receiving, at a first node in a network, data output by one or more data sources; updating the distributed ledger with a record of the received data, wherein the distributed ledger is implemented in the form of a distributed acyclic graph (DAG) and updating the ledger comprises adding a transaction to the DAG; and communicating the transaction to the other nodes in the network, using the mesh-based architecture.

15 Claims, 16 Drawing Sheets

A

B

| Property | Conventional network | IoT Mesh Network |
|---|---|---|
| Consensus protocol | Multiple round FPC ≈ (24*N)*2 messages per round | Single round optimized FPC N + 1 messages per round |
| IP access required | Yes | No |
| Full network propagation | 8*N messages | 1 message |
| Node joining verification | Loose security, timestamp based verification only | Provisioning required to join network, enforces permissioned nature, high security process |
| Neighbour selection | 8 neighbours 8-16 messages per node | Not required |
| Node list | Updated prior to FPC calls | Updated upon node joining |

Fig.16

METHODS AND SYSTEMS FOR STORING DATA USING A DISTRIBUTED LEDGER

FIELD

Embodiments described herein relate to methods and systems for storing data using a distributed ledger.

BACKGROUND

Internet of things (IoT) devices are a bridge from the real world to the digital world. From wearable devices to industrial sensors, they feed data about their environment and state to a network for processing. Current IoT networks face a variety of challenges, however. These challenges include the use of a central authority and the concerns of network monopolization, security, trust and privacy that come with this centralization. Further challenges include the need for assurance of high levels of security as well as data immutability and auditability to protect the vast amount of sensitive data being transmitted over the networks, as well as its validity and integrity, and ensuring that the network is resilient to faults.

Distributed ledger technology (DLT) is a promising solution for addressing the challenges faced by IoT networks. DLT utilizes a consensus algorithm to ensure that the nodes in the network agree as to the state and validity of the ledger at any one time and offer a decentralized approach to establishing trust. The most famous application of DLT is blockchain, which is used by a variety of cryptocurrencies, such as Bitcoin and Ethereum, with the major difference in the DLT between cryptocurrencies being the consensus algorithms implemented.

A network that implements DLT can provide many of the features desirable in an IoT network, including decentralization, immutability, auditability, and tolerance to faults. By removing the centralized authority, the nodes in the network can exchange data without the need for those transactions to be validated and authorized by that centralized authority, thereby removing the single point of failure and addressing privacy, trust, maintenance cost and environmental sustainability concerns. The structure of the distributed ledger means that it has inherent immutability; this is because in order to tamper with data, a majority of the nodes in the network would have to be compromised and accept the changes. Any transactions that were issued after the original data was added to the ledger would also have to be changed, making tampering near impossible. DLT also addresses the challenge of auditability as the ledger stores timestamped transaction records. Each node is given the option to house a full copy of the ledger if required, meaning that all transactions become easily verifiable and faults or data leakage can be easily identified. DLT brings extremely strong security to networks as well as additional attractive benefits such as the option for pseudonymity.

In addition to the blockchain implementations used for Bitcoin and Ethereum, other types of DLT implementation have been proposed. One example is a DLT based on a Distributed Acyclic Graph (DAG). FIG. 1A shows a schematic representation of a network that employs a distributed ledger in the form of a DAG. Here, each one of the computers 101a, 101b, 101c comprises a node in the network. The computers receive sensor data from respective sensors 103a, 103b, 103c and the network uses the DAG to store the sensor data.

The DAG itself is shown in FIG. 1B. Here, each one of the squares A, B, C, D . . . etc. represents a transaction that is stored in the ledger. In order to add a new transaction to the ledger, a computer node must first validate at least two existing transactions. On validating a transaction, an edge is added to the graph, connecting the newly added transaction to the newly validated transaction. In FIG. 1B, the edges are shown as arrows that extend from the newly added transaction to the validated transaction; in this way, the arrows represent approvals of the transactions by the various nodes in the computer network. As an example, the transaction B can be seen to have been validated by virtue of the arrows that point to B from each one of the later transactions E, F and G.

The DAG topology addresses many problems observed when using other types of DLT. In contrast to more conventional blockchain models, the use of a DAG avoids the need for transaction fees and miners, making it more suitable for IOT applications. Moreover, the means by which transactions are verified is simplified compared to other DLT transactions, allowing for greater speed and lower operating costs. Nevertheless, challenges still remain. In order that each one of the nodes should hold a consistent record of the DAG, each node will need to communicate information concerning transactions to the other nodes in the network. To date, approaches that utilise a DAG topology have employed an overlay network built on top of the Internet to provide peer-to-peer (P2P) communication between the various nodes. Using this overlay network, an individual node will gossip information concerning transactions to its nearest neighbour nodes, who in turn will pass on that gossip to their neighbours until the information reaches each one of the nodes in the network. The process by which messages propagate in the network is shown schematically in FIG. 2, in which a first node in the network (issuing node 0) sends message gossip to two nearest neighbours, nodes 1 and 2. The nodes 1 and 2 forward message gossip to their respective neighbour nodes 3 and 4, whilst also forwarding gossip back to node 0. Nodes 3 and 4 in turn forward on message gossip to their nearest neighbours, including sending gossip back to nodes 1 and 2 respectively. (For clarity, each node in FIG. 2 is depicted as having only two nearest neighbours).

As can be seen from FIG. 2, the conventional means for propagating information across the network requires the nodes to communicate to their neighbours both their own messages and those received and checked from neighbours. This process is further illustrated in FIG. 3, which shows the P2P communication employed in a conventional IoT network and FIG. 4, which shows the same message sequence but with redundant repeat communication removed for clarity.

The overlay network limits the speed of both message propagation and consensus affecting key metrics such as message final approval time and the propagation delay. It is desirable, therefore, to implement a network of computer nodes that utilise a distributed ledger in the form of a DAG, whilst enhancing the speed and efficiency with which the nodes in the network send and receive updates about transactions.

BRIEF DESCRIPTION OF DRAWINGS

Embodiments of the invention will now be described by way of example with reference to the accompanying drawings in which:

FIG. 16 shows a table summarising the differences between conventional IoT networks and embodiments described herein.

DETAILED DESCRIPTION

Figure 1:
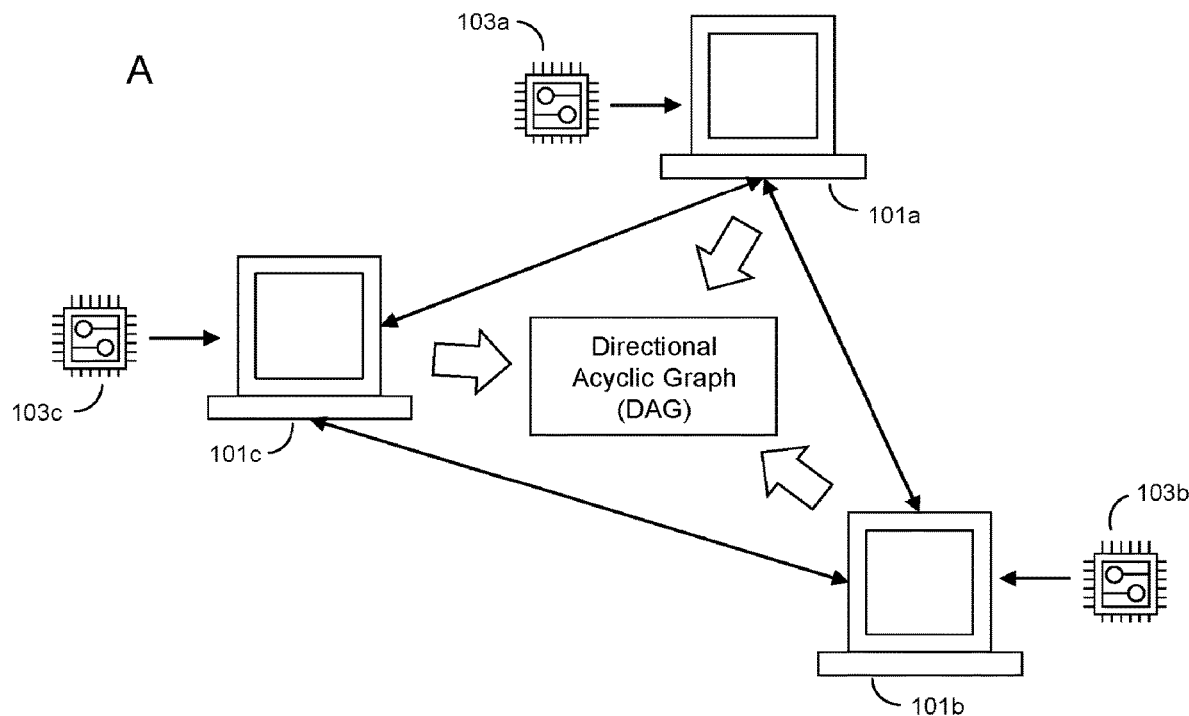
FIG. 1 shows a schematic representation of a network that employs a distributed ledger in the form of a DAG, suitable for use with embodiments described herein.
Figure 1:
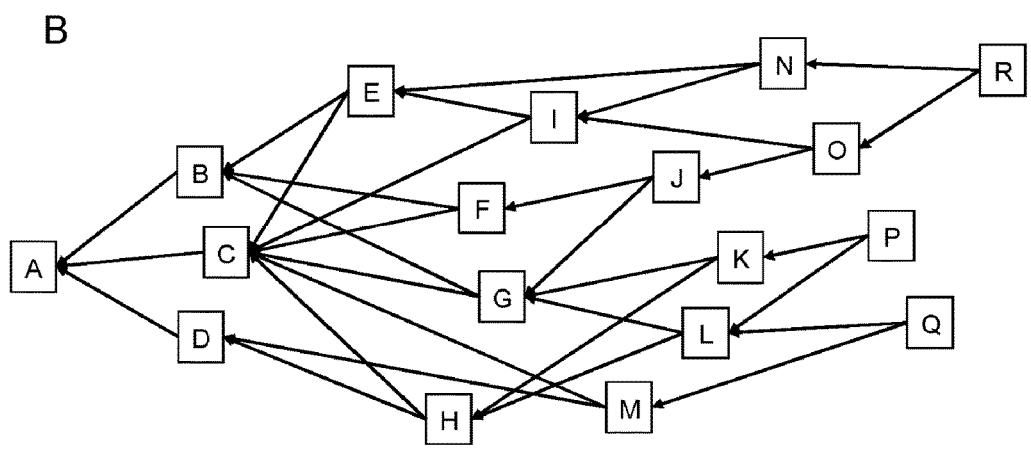

According to a first embodiment, there is provided a computer-implemented method for storing data using a distributed ledger maintained across a network of computer nodes having a mesh-based architecture, the method comprising:
receiving, at a first node in a network, data output by one or more data sources;
updating the distributed ledger with a record of the received data, wherein the distributed ledger is implemented in the form of a distributed acyclic graph (DAG) and updating the ledger comprises adding a transaction to the DAG; and
communicating the transaction to the other nodes in the network, using the mesh-based architecture.

Communicating the transaction to the other nodes in the network may comprise publishing a message to a group address to which two or more other nodes in the network subscribe.

Each node in the network may be provided with an individual address. The method may further comprise:

publishing, by the first node, a message to the group address indicating the individual address of the first node; and
receiving, via the individual address of the first node, respective messages from the two or more other nodes that subscribe to the group address, each received message indicating the individual address of the respective node.

The method may further comprise:
issuing, by the first node, a solidification request to the individual address of one of the two or more other nodes in the network, wherein the solidification request comprises a request for information pertaining to an earlier transaction recorded in the DAG;
receiving, via the individual address of the first node, a solidification response from the node to which the solidification request was sent, the solidification response comprising information pertaining to the earlier transaction; and
updating the DAG as stored at the first node in accordance with the solidification response.

The transaction may be communicated to the other nodes in the network using a flooding mechanism in which the first node broadcasts the message to nodes within range, and at least one of the nodes in range re-broadcasts the message to other nodes in its range using the group address.

The method may further comprise:
issuing, by the first node, a consensus request to the group address, wherein the consensus request comprises a request for nodes in the network to provide an opinion on the current state of the DAG;
receiving, via the group address, consensus responses from each of the two or more other nodes in the network, each consensus response comprising an opinion of the respective node on the current state of the DAG; and
updating the DAG as stored at the first node in accordance with the received consensus requests.

The first node may update the DAG based on the most frequently received opinion issued by the nodes in the network.

The consensus request may include the first node's opinion on the current state of the DAG.

The first node may update the DAG based on a single round of voting, wherein a round of voting comprises issuing the consensus request to the group address and receiving the consensus response from each node.

The first node may undergo a provisioning process in order to join the network. The provisioning process may be a Bluetooth Mesh provisioning process.

Updating the distributed ledger with a record of the received data may comprise encrypting the received data and storing the encrypted data on the DAG, such that the content of the data is not visible to other nodes in the network. The method may further comprise providing a second one of the nodes with a decryption key for decrypting the encrypted data, so as to view the data as received by the first node.

The method may further comprise: establishing a smart contract with a second one of the nodes in the network, wherein the second one of the nodes is provided with the decryption key upon successful execution of the smart contract.

The data may be sensor data received from one or more sensors. The one or more sensors may comprise an optical sensor or acoustic sensor.

According to a second embodiment, there is provided a computing device configured to carry out a method according to the first embodiment.

According to a third embodiment, there is provided a network of computing devices according to the second embodiment.

According to a fourth embodiment, there is provided a non-transitory computer readable storage medium comprising computer executable instructions that when executed by a computer will cause the computer to carry out a method according to the first embodiment.

In embodiments described herein, a mesh-based communications network is implemented whereby each node that stores a portion of the distributed acyclic graph subscribes and publishes messages to the same group address. The mesh-based network replaces the overlay network that is used to circulate information between the nodes of a conventional IoT network, and facilitates direct P2P communication between the whole network. By doing so, nodes in the network can more efficiently communicate and obtain knowledge of one another; this in turn can help create an IoT network with a reduced approval time for each transaction, a faster consensus and a reduced transaction propagation delay across the network.

Figure 5:
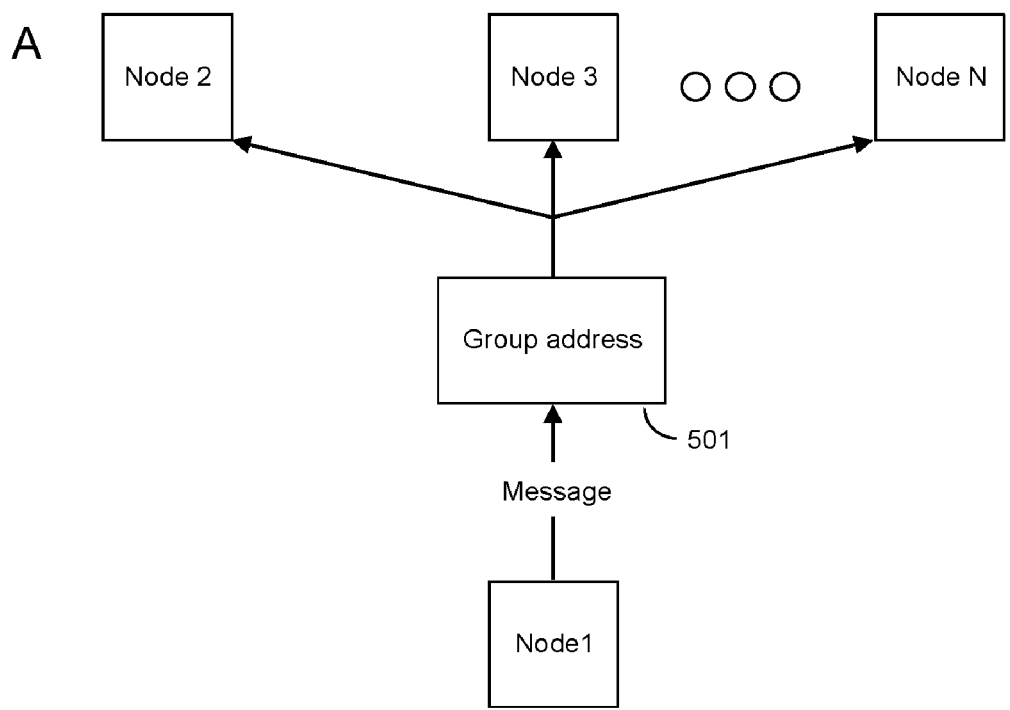
FIG. 5 shows a schematic of how a group address is used to communicate information between nodes of an IoT network, according to an embodiment.

The process of using the group address to communicate information between nodes is shown schematically in FIG. 5. Here, a first node (node 1) publishes a message to the group address 501. Since each of the other nodes in the network (nodes 2, 3, . . . N) subscribes to the group address, each node that lies within communication range of the first node will receive the message directly from node 1. Nodes that lie outside the communication range of the first node can still receive the message through use of a flooding mechanism whereby nodes that lie within communication range of the first node relay that message to all other devices in their range. Thus, by using the group address—and where necessary, flooding—each node can effectively be made a neighbour of every other node on the network. In doing so, embodiments effectively provide two-way communication between every node and remove the need for a neighbour selection protocol as used in conventional IoT networks.

Figure 2:
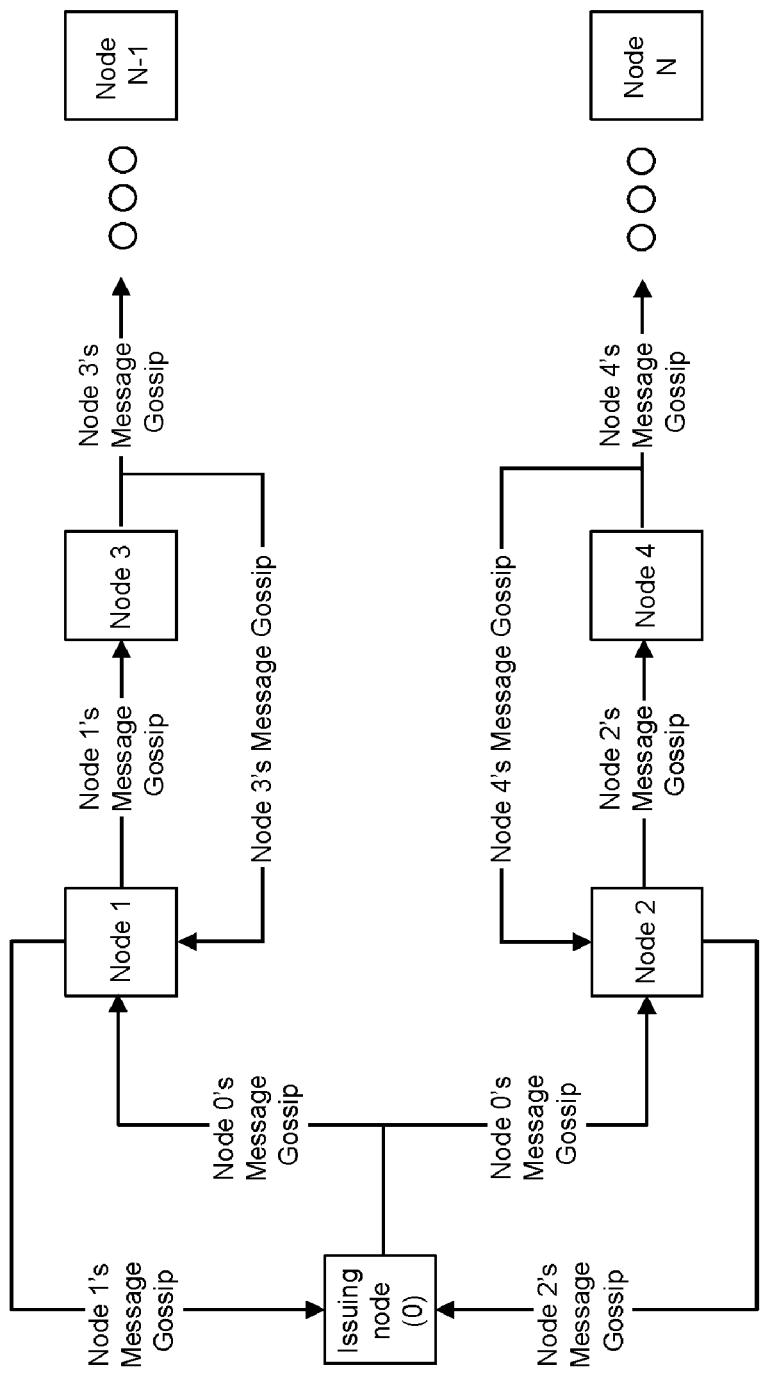
FIG. 2 shows a schematic of how messages are propagated between nodes in a conventional IoT network.
Figure 3:
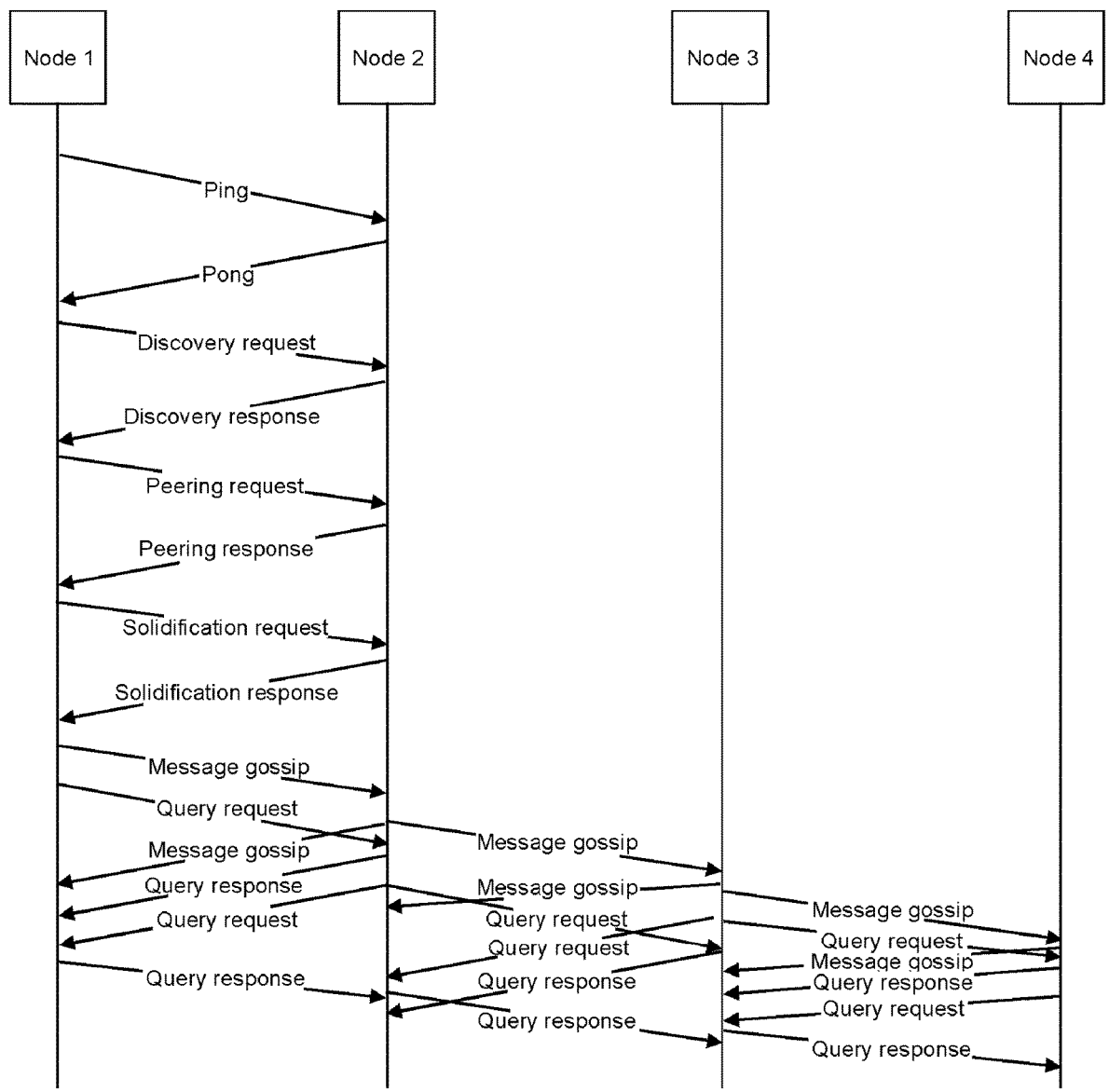
FIG. 3 shows the P2P communication employed in a conventional IoT network.
Figure 4:
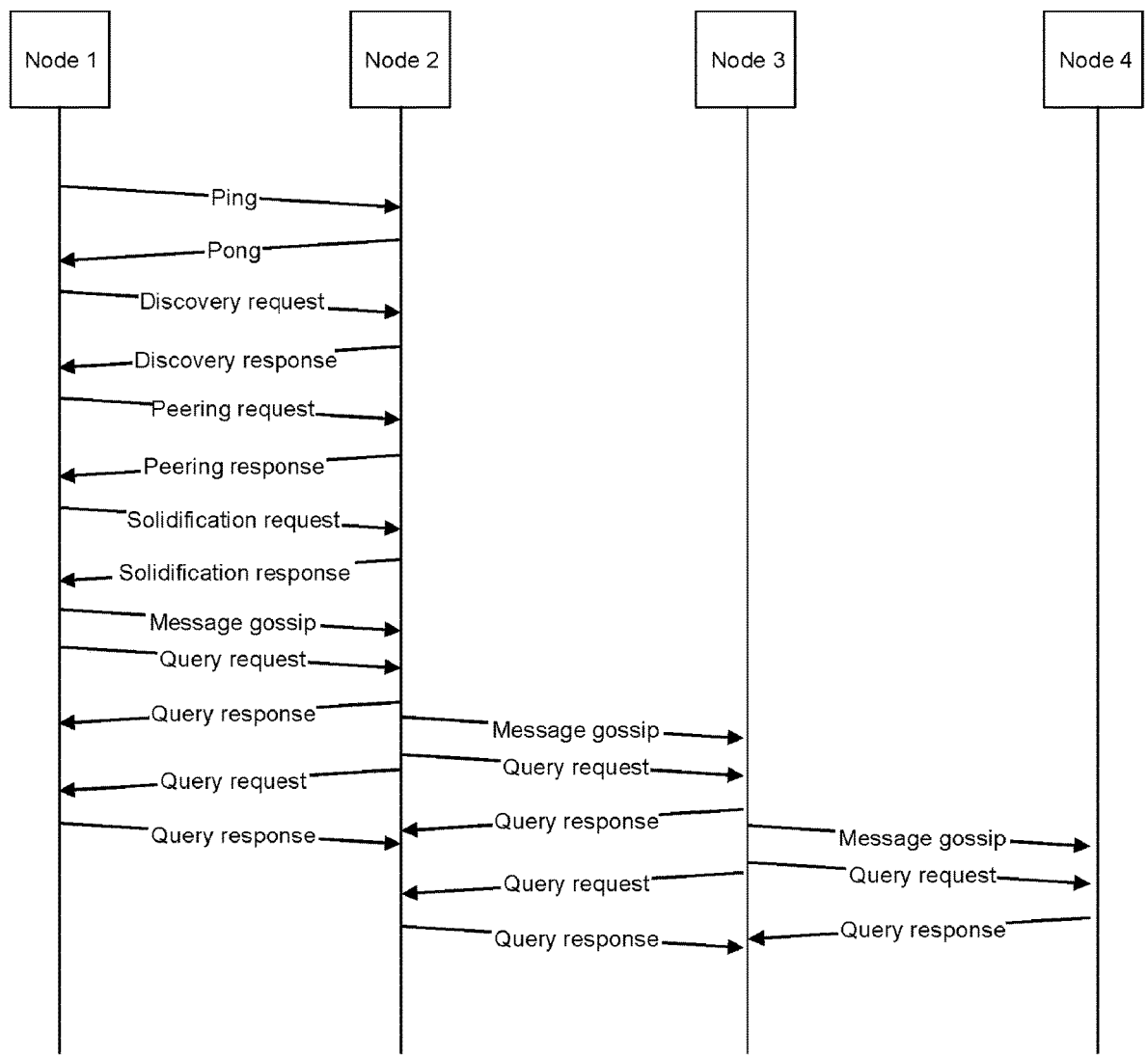
FIG. 4 shows the message sequence of FIG. 3 with redundant repeat communication removed.
Figure 6:
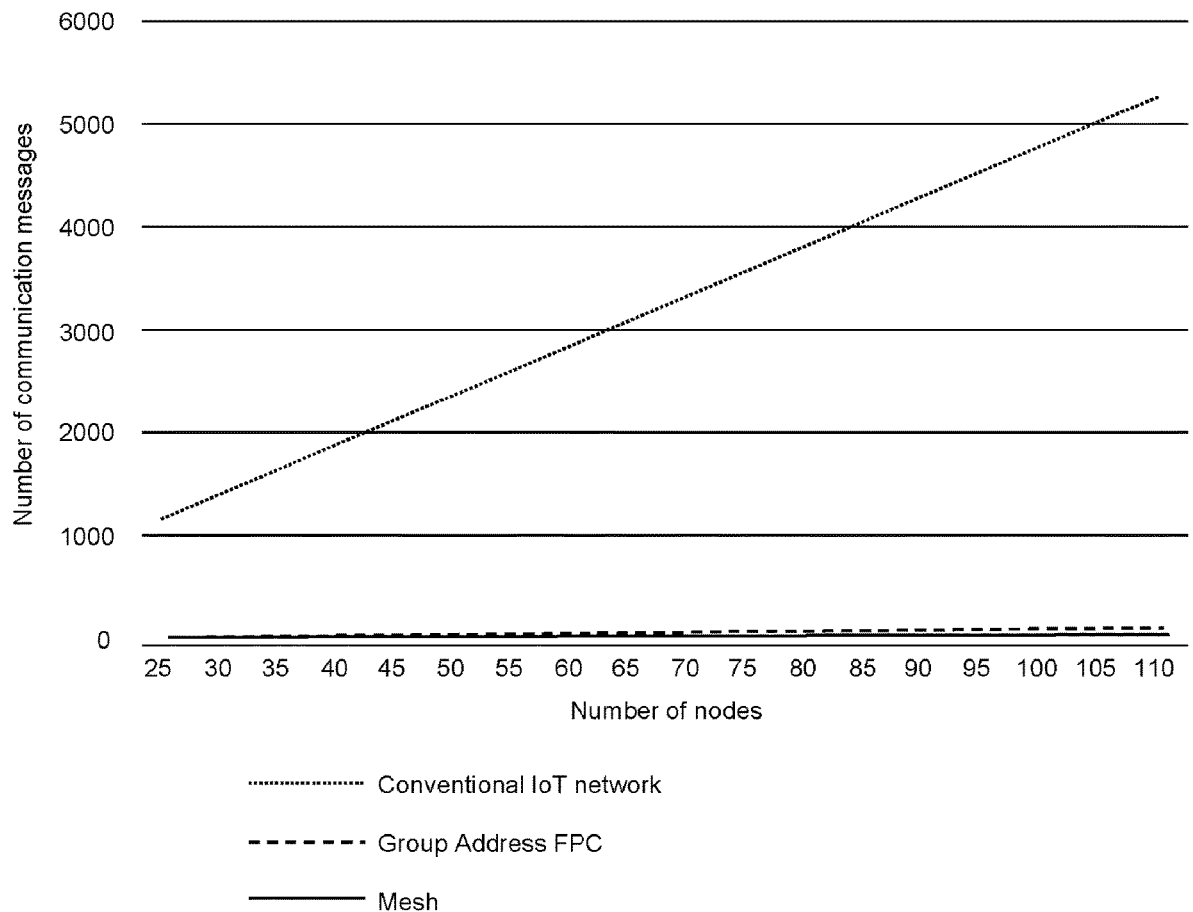
FIG. 6 shows the difference in communication complexity observed when using a conventional IoT network and when using an embodiment described herein.

FIG. 6 shows the difference in communication complexity observed when using a conventional IoT network with a gossip protocol similar to that of FIG. 2, compared to an embodiment described herein. The graph shows how the number of communication messages required for full network message propagation scales with the number of nodes for three scenarios: (i) a gossip protocol on a conventional IoT network with a neighbour size of 8, (ii) the same gossip protocol but optimized by removing repeat redundant communication and (iii) a mesh based group addressing approach according to the embodiments described herein. In the latter case, due to all nodes being reachable using the group address, the communication complexity remains constant as the number of nodes increase. In contrast, the communication complexity for the two scenarios that rely on a gossip implementation both increase with the number of nodes.

Figure 7:
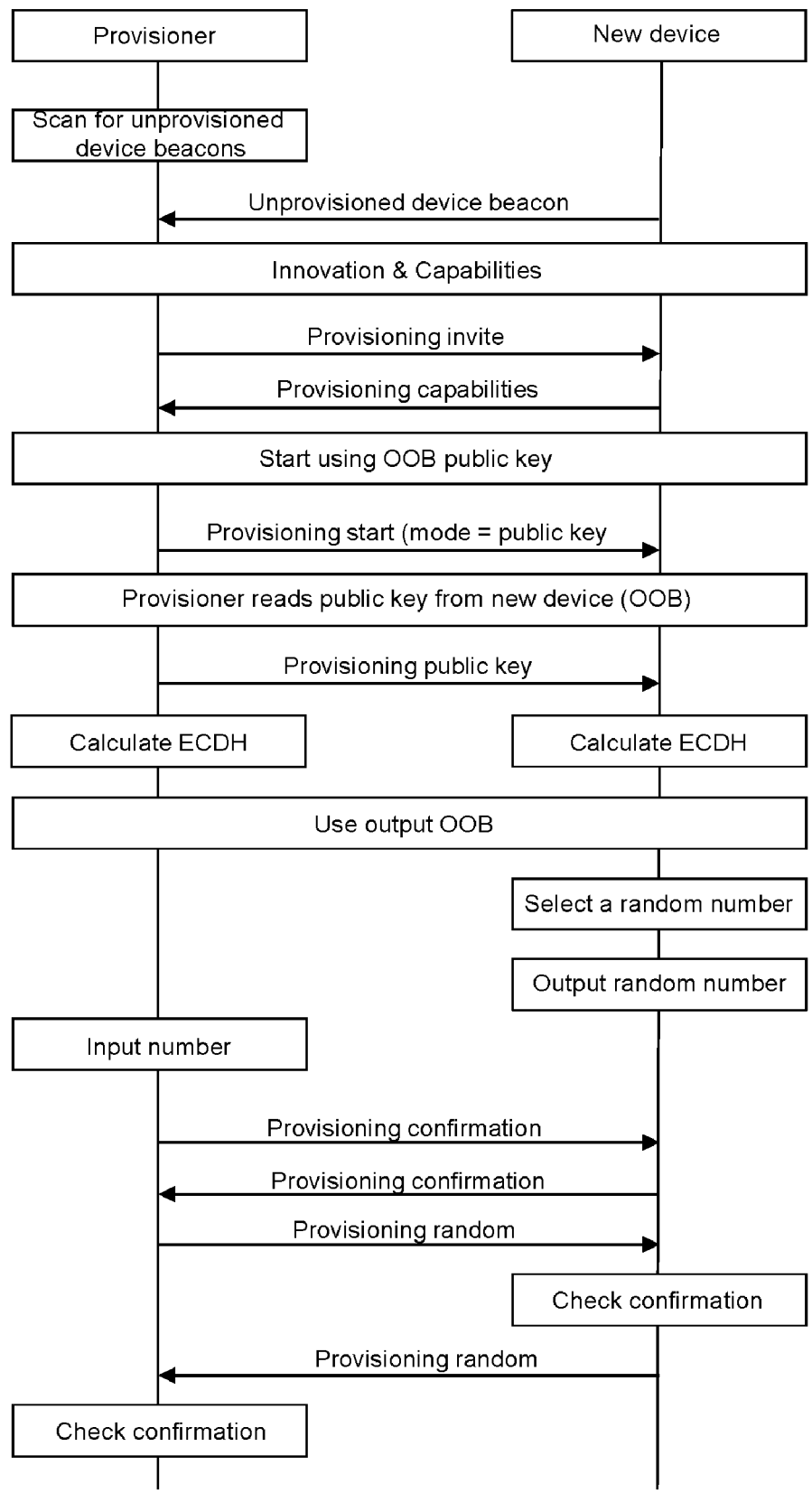
FIG. 7 shows a sequence of steps used in the Bluetooth Mesh provisioning procedure.

In embodiments described herein, a node seeking to join the network may first undergo a provisioning process, to ensure that the network remains private and permissioned. An example process is Bluetooth Mesh provisioning, shown schematically in FIG. 7. Bluetooth Mesh provisioning relies on the anonymous key agreement protocol Elliptic Curve Diffie—Hellman (ECDH), and proceeds through five main stages: beaconing, invitation, exchange of public keys, authentication and distribution of provisioning data. The process uses public and private keys to distribute a symmetric secret key that the provisioning device and the new device (i.e. the node seeking to join the network) can use for encryption and decryption of subsequent messages. The ECDH public keys may be exchanged over a Bluetooth link or through an OOB tunnel.

Figure 8:
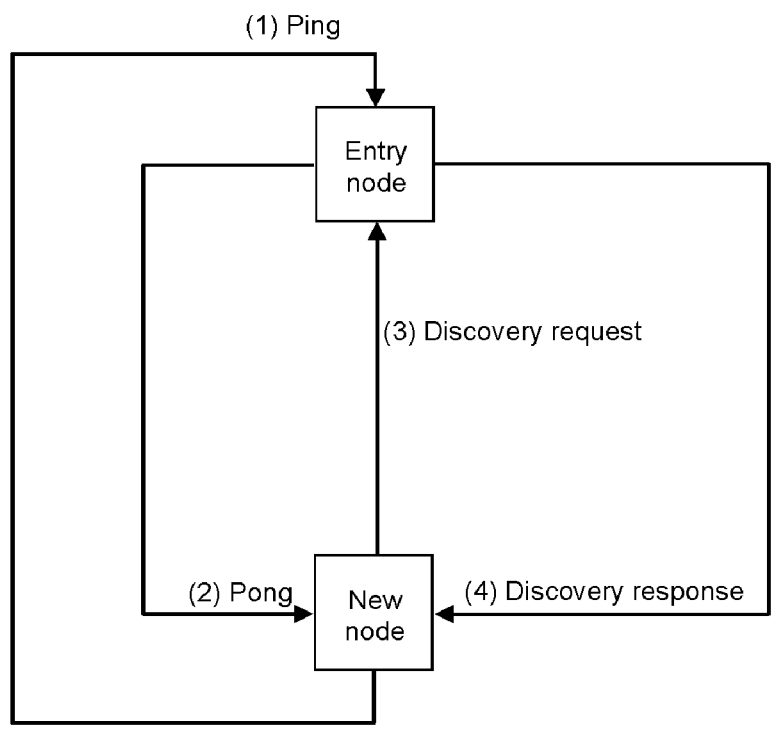
FIG. 8 shows a verification communication that is employed as part of an auto-peering protocol in a conventional IoT network.

It will be appreciated that the above described provisioning process also replaces the verification communication that is employed as part of the auto-peering protocol in a conventional IoT network, this conventional process being shown schematically in FIG. 8.

The provision process provides a form of admission control to the network; the provisioning process means a node has to be explicitly verified, identified and approved by the network in order to read or send any communication, and enforces the private aspect of the network, enforcing its permissioned nature.

Figure 9:
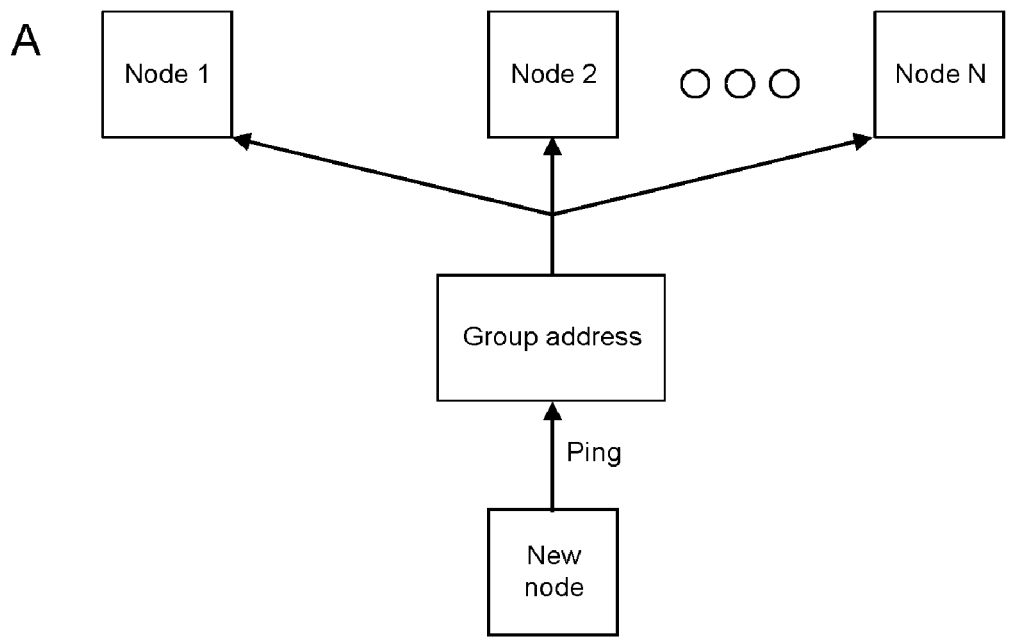
FIG. 9 shows a schematic of how a group address is used for adding a node's individual address to the respective peer lists of other nodes in the network, according to an embodiment.
Figure 9:
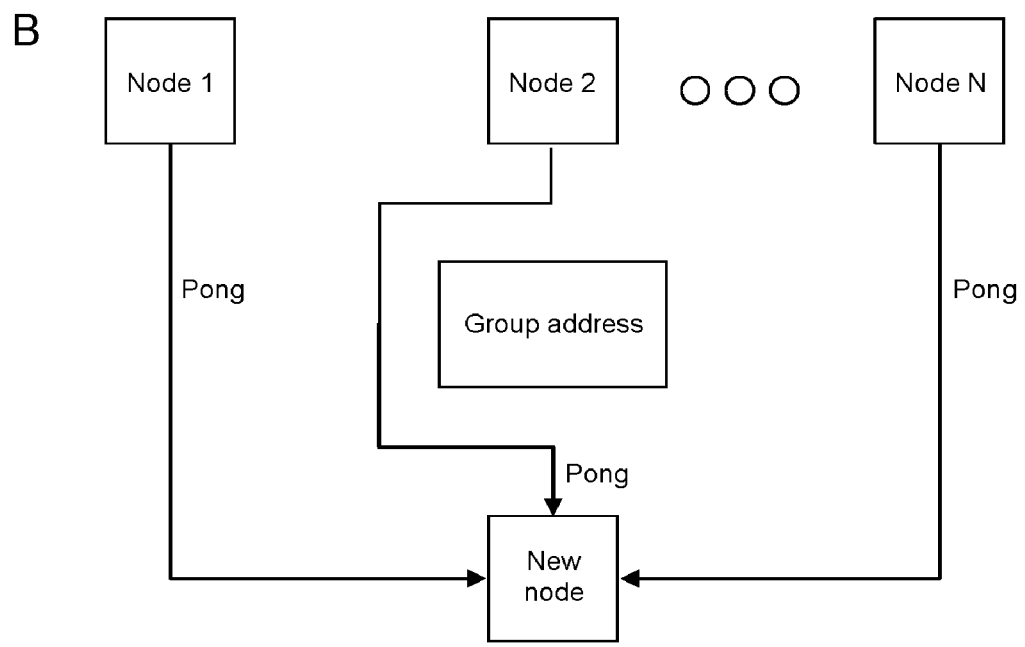

Once a node has been provisioned and allowed to join the network, the new node may use the group address to send a ping message to every other node in the network, providing them with its individual address to add to their respective peer lists. This process is shown schematically in FIG. 9A. Once the other nodes have added the new node's individual address to their respective peer lists, those nodes may then reply to that address with a pong message specifying their own individual address (FIG. 9B). The newly added node takes the node's addresses from the pong replies and populates its own peer list. In this way, each node can obtain a complete copy of nodes on the network and continue to stay updated as further nodes join the network. Thus, by enabling every node to communicate with the whole network via a group address, embodiments provide a differentiated approach to peer discovery to generate an updating and complete peer.

Figure 10:
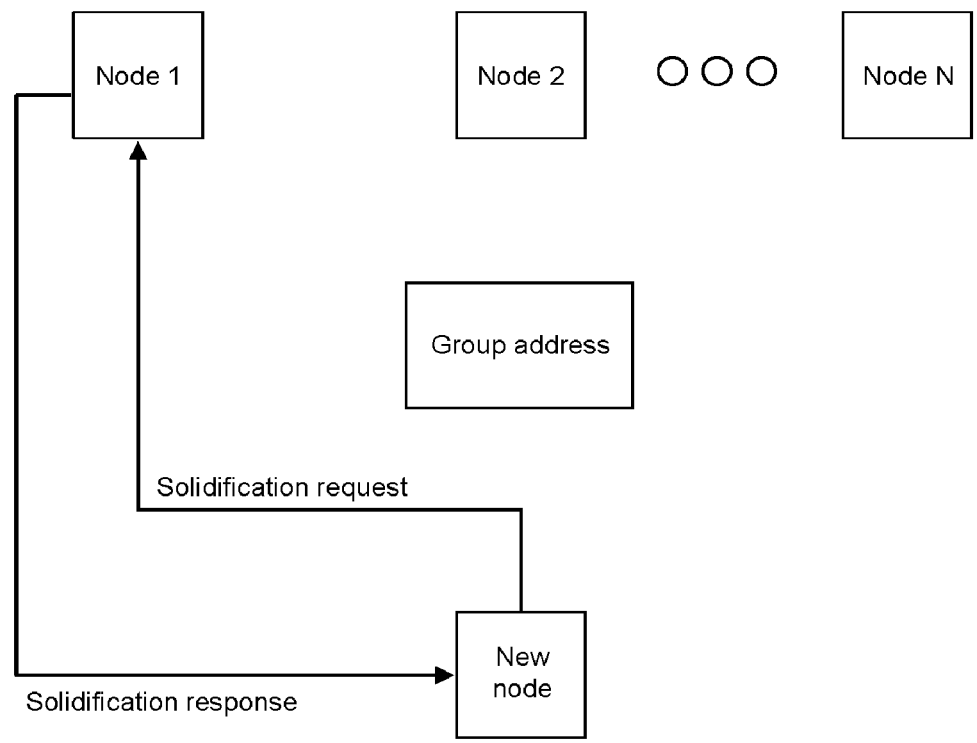
FIG. 10 shows a schematic of how solidification requests and responses are sent between nodes of a network, according to an embodiment.

In some cases, a particular one of the nodes in the network may need to request a copy of a missed message from another node, a process referred to as "solidification". For example, a node may have only joined the network after the message in question was first circulated; here, the fact that the node does not have the full message history may prevent its being able to confirm one or more transactions or chains of transactions stored in the DAG. As shown in FIG. 10, when sending such a solidification request, the node will avoid using the group address as this would result in repeat responses from the whole network causing unnecessary congestion. Instead, the node will use its peer list of (individual) node addresses to send the solidification request to the node in question. In a similar way, the solidification response will be sent to the individual address of the requesting node, rather than the group address.

In some embodiments, the group address may be used as part of the process of consensus voting on the state of the distributed graph. Conventionally, this is achieved through a fast probabilistic consensus (FPC) algorithm, in which nodes in the network query other nodes for a vote or opinion on the "correct" state of the graph. As discussed above, the mesh network architecture increases the neighbourhood size to the size of the network i.e. each node is able to communicate directly with each other node in the network. A consequence of this is that the quorum size used by fast probabilistic consensus (FPC) is also increased, meaning that the operation of the consensus protocol is drastically altered. By asking the whole network to vote each round, nodes will reach finality in just one round and will simply take the leading opinion they receive during voting. The most dominant initial opinion will in turn always be selected. This operation of FPC removes the need for a decentralized random number generator (dRNG) as used in a conventional network, since a randomized threshold would no longer increase the efficiency of the protocol.

In practice, in the embodiments described herein, an issuing node will wait until the network's maximal propagation time has elapsed before sending an FPC Request. Doing so will help to maximise the number of nodes that receive its message and thus will be able to vote. When issuing the FPC request, a node will also include its initial opinion as to the state of the graph; upon receiving this request, the other nodes can then use the group address to send their opinion, within an FPC response, to the rest of the network. When each node has done this, every node on the network should have level 3 knowledge as to say that every node knows the full opinion of the network and knows that every other node does too.

Figure 11:
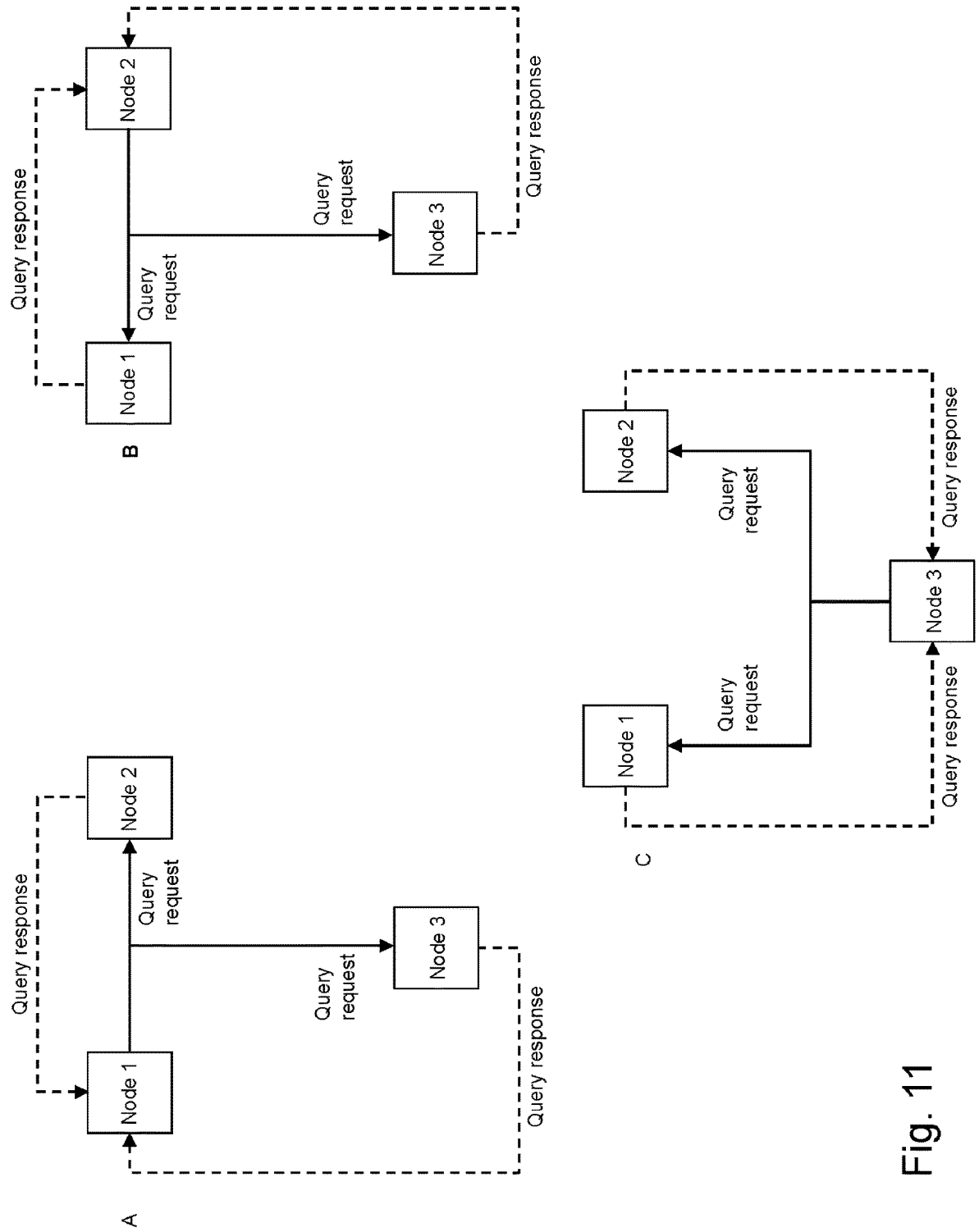
FIG. 11 shows how an FPC algorithm may be implemented in a conventional IoT network.
Figure 12:
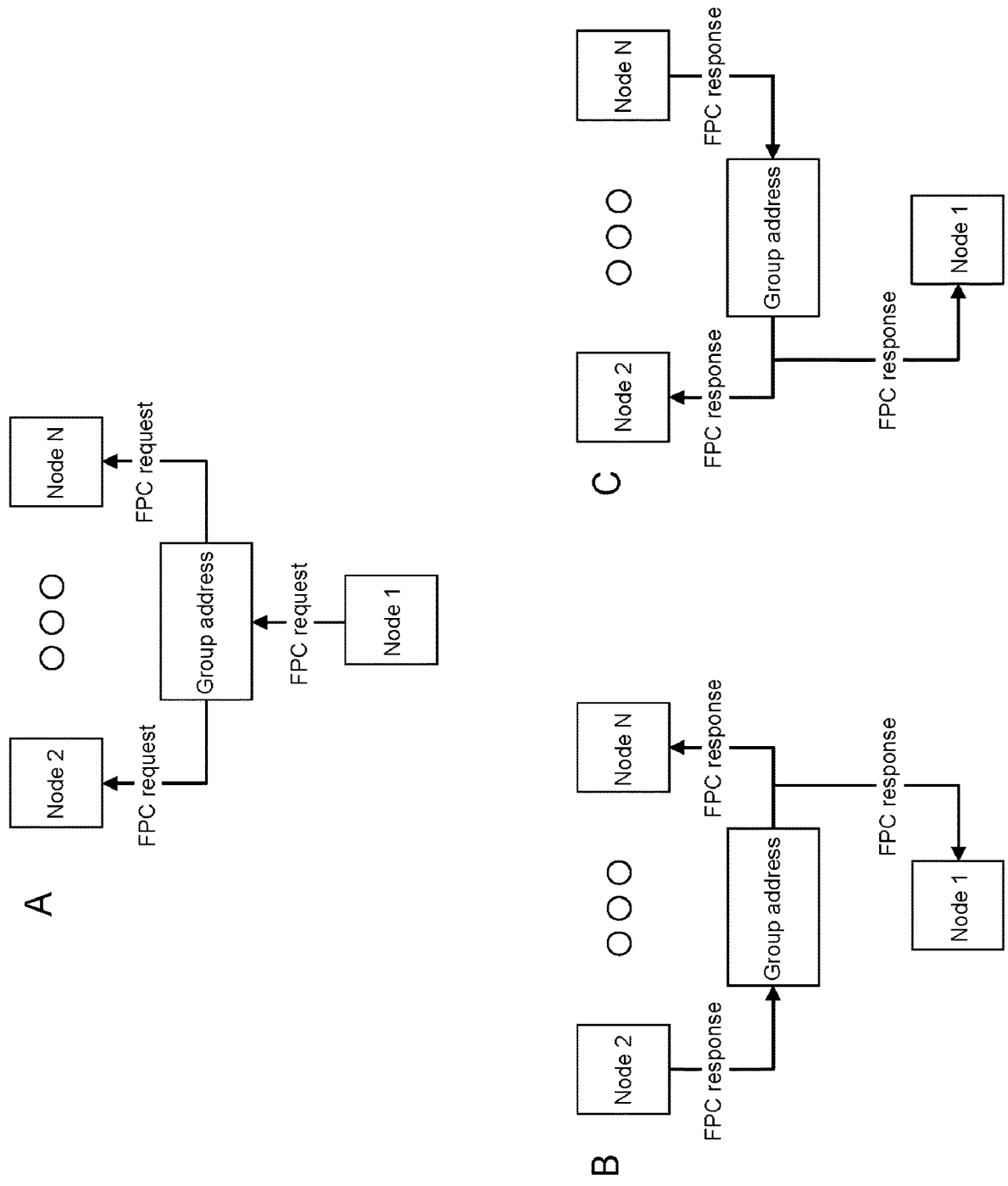
FIG. 12 shows how an optimised FPC protocol may be implemented according to an embodiment.

The difference between implementing a conventional FPC algorithm and one using a mesh network structure according to embodiments described herein can be further understood by reference to FIGS. 11 and 12. FIG. 11 shows how a conventional FPC algorithm operates using the protocol's communication messages. For clarity, this diagram depicts only a 3-node network of which all nodes are neighbours. Here, each node sends a separate voting request to each one of the other nodes' addresses, and receives a respective response from those nodes. FIG. 11A shows the first node, node 1 sending requests to nodes 2 and 3, and receiving respective responses from the nodes 2 and 3. FIG. 11B shows the second node, node 2, sending requests to nodes 1 and 3, and receiving respective responses from the nodes 1 and 3. FIG. 11C shows the third node, node 3, sending requests to nodes 1 and 2, and receiving respective responses from the nodes 1 and 2. In contrast, FIG. 12 shows how an optimised FPC protocol is run according to embodiments described herein. Here, the first node, node 1, sends its request to the group address, and the request is in turn received by each one of the other nodes in the network (FIG. 12A). Those nodes in turn issue a response to the group address: FIG. 12B shows the second node, node 2, issuing its response, which is in turn received by nodes 1 . . . N via the group address, whilst FIG. 12C shows the nth node, node N, issuing its response, which is in turn received by nodes 1 and 2 via the group address.

Figure 13:
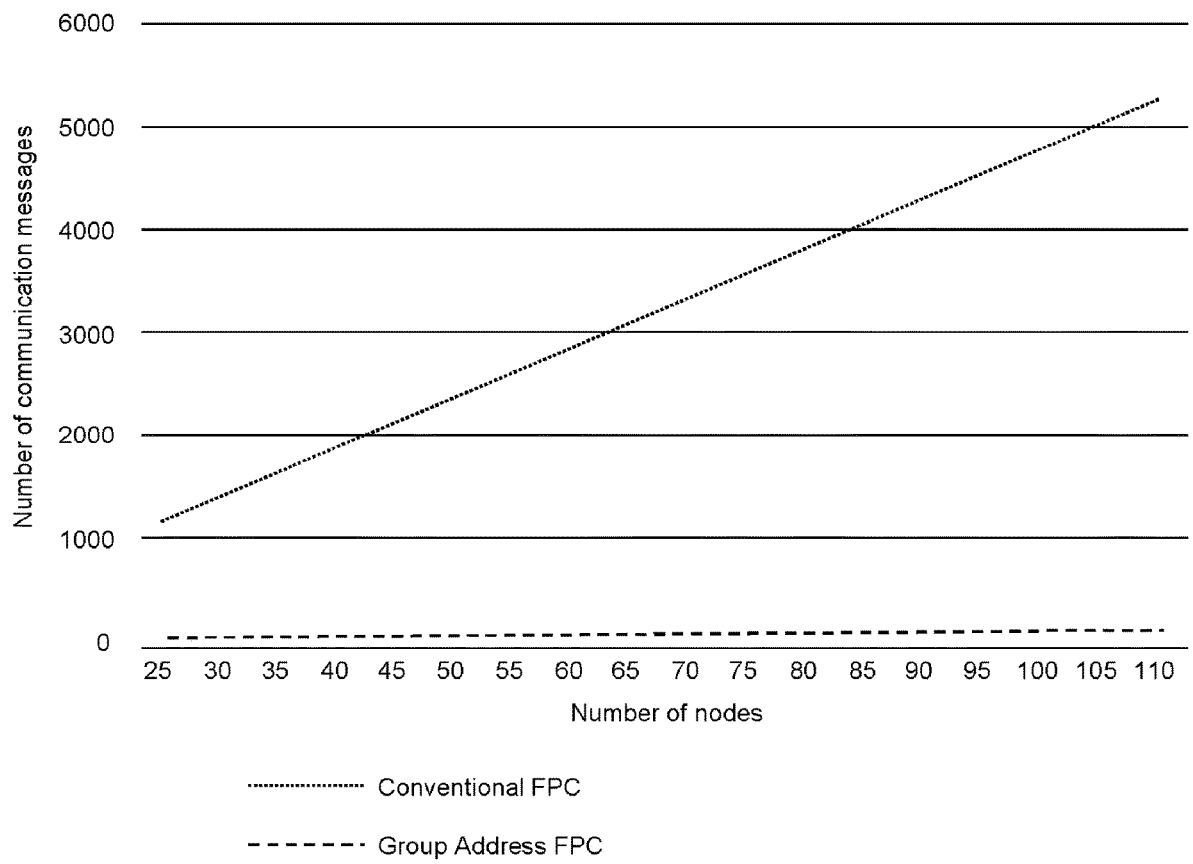
FIG. 13 shows a comparison between the number of messages required for a full network to run a conventional round of FPC and the number of messages required when using an embodiment described herein.

It can be seen from FIG. 12 that by sending their responses to the group address, rather than to the individual addresses of each other node, the nodes in the network need only send a single response (vote) to the network as part of the consensus algorithm. At the same time, a round of consensus voting can be initiated by a single node—in the case of FIG. 10, node 1—sending a request to the group address. In this way, embodiments described herein can significantly reduce the complexity involved in establishing a consensus across the nodes as to the state of the DAG. This is further exemplified by FIG. 13, which compares the number of messages required for a full network (i.e. every node) to run a conventional round of FPC and the number of messages required when using an embodiment described herein. Here, it is assumed for the conventional network that the maximum quorum size is the default 24 and that no large nodes upload their response via the DAG. It is clear from FIG. 13 that the described embodiment provides a significant reduction in communication complexity when executing the FPC algorithm, compared to the conventional FPC algorithm.

Figure 14:
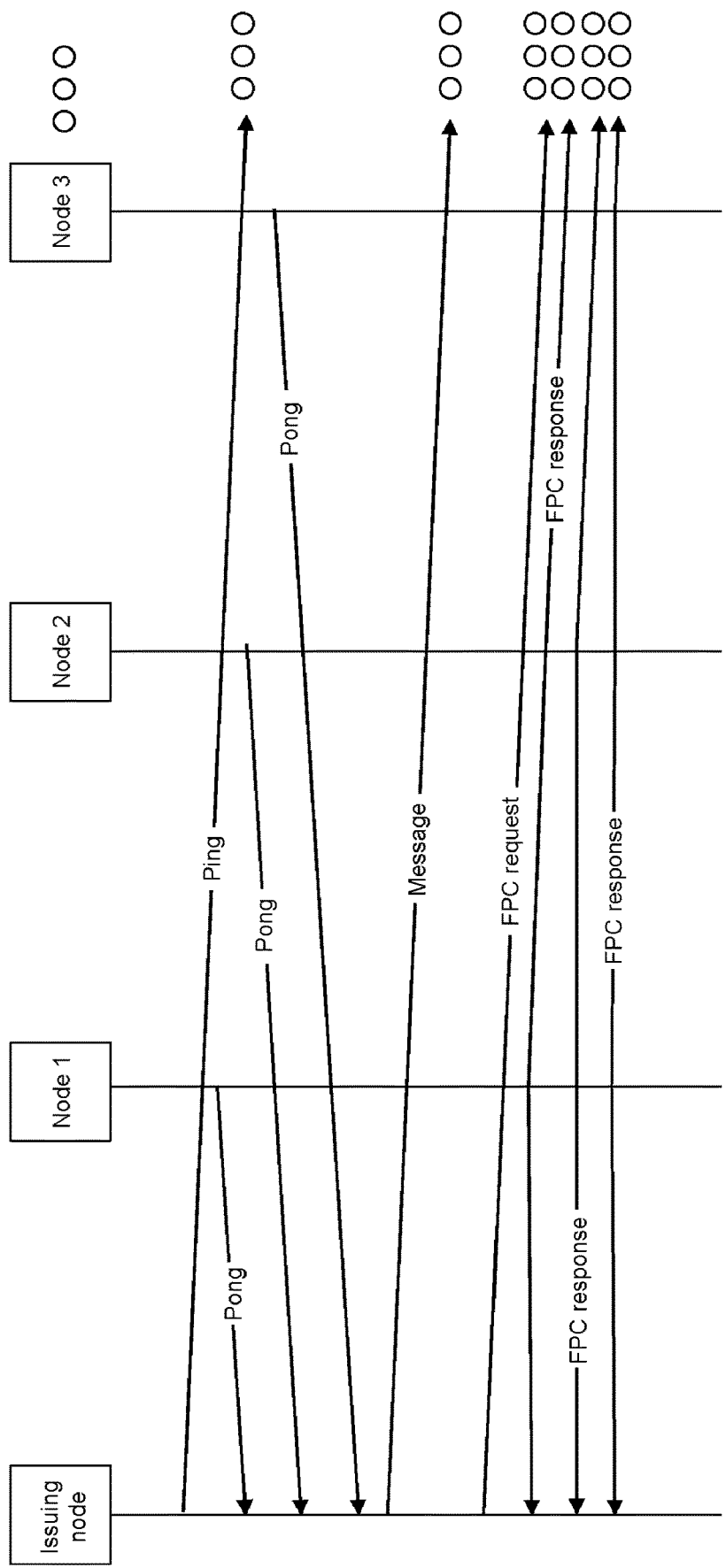
FIG. 14 shows a schematic summarising the communications sent between nodes in an IoT network according to an embodiment.

FIG. 14 summarises the communications sent between nodes in an IoT network according to an embodiment. As shown, an issuing node may send a ping message to each one of the other nodes in the network, by using the group address. Each node may then issue its own individual pong response (see FIG. 9 as well). In a similar way, the issuing node may initiate a round of the FPC algorithm by sending an FPC request to the group address. Each one of the other nodes in the network may in turn transmit an FPC response to the group address. By sending the FPC responses to the group address, each node need only send a single FPC response, which will then be received by all the other nodes in the network.

Figure 15:
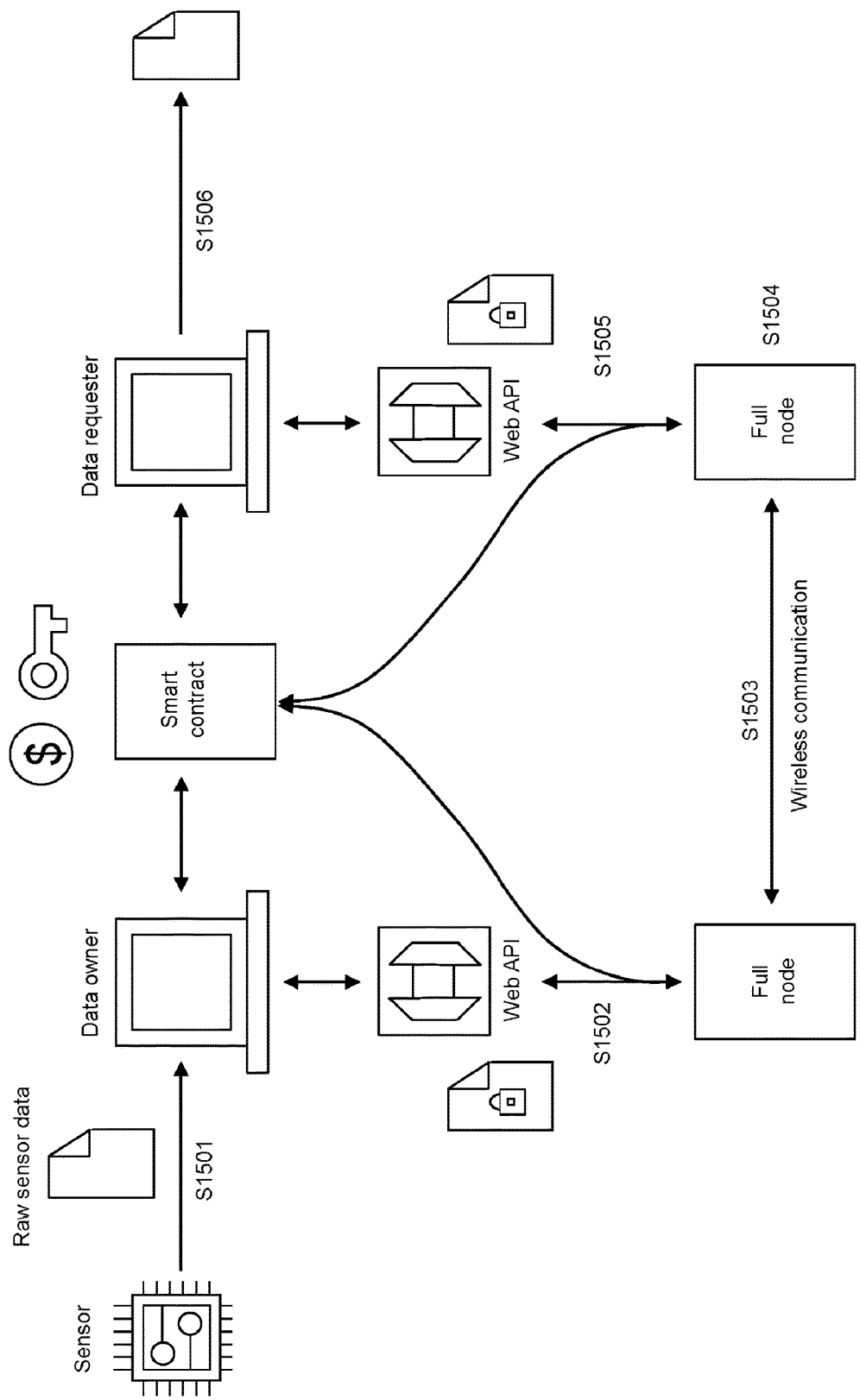
FIG. 15 shows an example process in which an IoT network according to an embodiment is used to upload encrypted IoT sensor data via nodes to a distributed ledger.

FIG. 15 shows an example of process in which an IoT network according to an embodiment may be used for secure transfer of data between nodes. Referring to that Figure, the process commences in step 1501 in which sensor data output by a sensor is received by a data owner. The sensor data may comprise data captured by one of a number of different types of sensor, including optical sensors (e.g. cameras), acoustic sensors (e.g. microphones), electrical sensors etc. The sensor data is encrypted and packaged into a transaction, which is then forwarded via a Web API to one of the nodes of the network (step S1502). The node logs the transaction on the DAG by validating two existing transactions in the graph and updating the other nodes of the network over a wireless communication channel, using the group address to reach each one of the nodes directly (S1503). A second node, receiving the update, validates and attaches the transaction to its view of the DAG (step S1504).

A data requester, connected to the second node, is able to see the transaction in the DAG together with the attached encrypted data. In order for the data requester to obtain access to the encrypted data, a smart contract may be initiated between the data owner and the data requester, offering access to the encrypted data stream in exchange for an agreed value. On successful execution of the smart contract, the data requester is provided with a key to decrypt the sensor data (step S1506). By virtue of these features, the network will show improvements in the number of possible sensor readings (messages) that can be shared per second and successfully approved and stored by the network in comparison to a conventional IoT network.

Embodiments described herein can provide a number of improvements over conventional IoT networks. These improvements are summarised in FIG. 16 and include among others:

A decreased network message propagation time leading to faster ledger state synchronisation, meaning a new message can be retrieved correctly from the whole network after a shorter delay.

A decreased message approval time, which will reduce the overall time for consensus opinions to be considered final, thus increasing the rate of approved transactions.

A faster consensus mechanism, allowing for transactions to be approved and added to the ledger state at a faster rate.

The direct wireless connectivity between all nodes removes the need for an overlay network built on top of the internet and facilitates a fully local network. It also is beneficial for the inclusion of IoT nodes in hard to reach areas to the network.

Communication traffic reduction and optimisation. Implementation of the mesh network removes the need for neighbour selection communication as well as streamlining the auto peering procedure. The optimised FPC algorithm reduces communication complexity via the use of group addressing and repeat message gossiping can also be eliminated.

It will be appreciated that embodiments have numerous applications including private data sharing, data access control, data storage, data monetisation, IoT and smart city applications. In particular, embodiments bring the security and storage benefits associated with DTL to IoT devices and their data, as well as harnessing a mesh network to improve the IoT network's speed, efficiency and connectivity. When combined with encryption-based messaging, embodiments can facilitate an auditable, decentralized, immutable, secure, and private network for IoT data storage and access control.

It will further be appreciated that, whilst the above-described embodiments relate to the storage and communication of sensor data, this is by no means essential and embodiments are equally applicable to the storage and communication of other types of data. For example, the data may comprise details of financial payments, transfers of property or other assets, personnel files, medical records etc.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

While certain embodiments have been described, these embodiments have been presented by way of example only and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The invention claimed is:

1. A computer-implemented method, comprising:
receiving, at a first node in a network of computer nodes having a mesh-based communications network, data output by one or more data sources, the data being stored using a distributed ledger maintained across the network, the distributed ledger storing a transaction, the mesh-based communications network facilitating direct peer-to-peer communication between the computer nodes in the network, the mesh-based communications network being implemented whereby each node that stores a portion of a distributed acyclic graph (DAG) subscribes and publishes messages to a same group address;
updating the distributed ledger with a record of the received data, wherein the distributed ledger is implemented in the form of the DAG and uses a consensus algorithm, updating the distributed ledger includes validating at least two existing transactions in the distributed ledger and adding another transaction to validated transactions in the DAG, wherein the consensus algorithm ensures that the computer nodes in the network agree as to a state and a validity of the distributed ledger at any one time; and
communicating the another transaction to other nodes in the network, using the mesh-based communication network,
wherein the step of communicating the another transaction to the other nodes in the network includes publishing the messages to the same group address to which two or more other nodes in the network subscribe;
wherein each node in the network is provided with an individual address, the method further comprising:
publishing, by the first node, a message to the group address indicating the individual address of the first node; and
receiving, via the individual address of the first node, respective messages from the two or more other nodes that subscribe to the group address, each received message indicating the individual address of respective nodes;
issuing, by the first node, a solidification request to the individual address of one of the two or more other nodes in the network, wherein the solidification request includes a request for information pertaining to an earlier transaction recorded in the DAG:
receiving, via the individual address of the first node, a solidification response from the one of the two or more nodes to which the solidification request was sent, the solidification response including information pertaining to the earlier transaction; and
updating the DAG as stored at the first node in accordance with the received solidification response.

2. The computer-implemented method according to claim 1, wherein the another transaction is communicated to the other nodes in the network using a flooding mechanism in which the first node broadcasts a message to nodes within range, and at least one of the nodes in range re-broadcasts the message to other nodes using the group address.

3. The computer-implemented method according to claim 1, further comprising:
issuing, by the first node, a consensus request to the group address, wherein the consensus request includes a request for the nodes in the network to provide an opinion on a current state of the DAG;
receiving, via the group address, consensus responses from the two or more other nodes in the network, each consensus response comprising an opinion of the respective node on the current state of the DAG; and
updating the DAG as stored at the first node in accordance with the received consensus responses.

4. The computer-implemented method according to claim 3, wherein the first node updates the DAG based on a most frequently received opinion issued by the nodes in the network.

5. The computer-implemented method according to claim 3, wherein the consensus request includes an opinion of the first node on the current state of the DAG.

6. The computer-implemented method according to claim 3, wherein the first node updates the DAG based on a single round of voting, wherein a round of voting includes issuing the consensus request to the group address and receiving the consensus responses from nodes.

7. The computer-implemented method according to claim 1, wherein the first node undergoes a provisioning process in order to join the network.

8. The computer-implemented method according to claim 7, wherein the provisioning process is a Bluetooth Mesh provisioning process.

9. The computer-implemented method according to claim 1, wherein updating the distributed ledger with the record of the received data includes encrypting the received data and storing the encrypted data on the DAG, such that content of the data is not visible to the other nodes in the network, the method further comprising:
providing a second one of the nodes with a decryption key for decrypting the encrypted data, so as to view the data as received by the first node.

10. The computer-implemented method according to claim 9, comprising:
establishing a smart contract with the second one of the nodes in the network, wherein the second one of the nodes is provided with the decryption key upon successful execution of the smart contract.

11. The computer-implemented method according to claim 1, wherein the data is sensor data received from one or more sensors.

12. The computer-implemented method according to claim 11, wherein the one or more sensors includes an optical sensor or an acoustic sensor.

13. A computing device configured to perform the method according to claim 1.

14. A network of computing devices, wherein the computing devices include the computing device according to claim 13.

15. A non-transitory computer-readable storage medium comprising computer executable instructions that, when executed by a computer, cause the computer to perform the method according to claim 1.

* * * * *